United States Patent [19]

Stankov et al.

[11] Patent Number: 4,914,658
[45] Date of Patent: Apr. 3, 1990

[54] MODE-LOCKED LASER

[75] Inventors: Krassimir Stankov; Fritz P. Schäfer, both of Goettingen, Fed. Rep. of Germany

[73] Assignee: Max-Plank-Gesellschaft zur Foerderung der Wissenschaften e.V., Goettingen, Fed. Rep. of Germany

[21] Appl. No.: 263,628

[22] Filed: Oct. 27, 1988

[30] Foreign Application Priority Data

Oct. 30, 1987 [DE] Fed. Rep. of Germany ....... 3736881
Aug. 5, 1988 [DE] Fed. Rep. of Germany ....... 3826716

[51] Int. Cl.$^4$ ............................................. H01S 3/098
[52] U.S. Cl. ......................................... 372/18; 372/21; 372/99; 372/108
[58] Field of Search ..................... 372/18, 97, 99, 108, 372/32, 21

[56] References Cited

U.S. PATENT DOCUMENTS

| | | | |
|---|---|---|---|
| 3,700,307 | 10/1972 | Glenn | 372/18 |
| 4,063,105 | 12/1977 | Aggarwal et al. | 307/425 |
| 4,063,195 | 12/1977 | Abrams et al. | 307/425 |
| 4,085,335 | 4/1978 | Gudino | 307/425 |
| 4,128,772 | 12/1978 | Chang et al. | 307/425 |
| 4,321,550 | 3/1982 | Evtuhov | 307/425 |
| 4,330,721 | 5/1982 | Hauck et al. | 307/425 |
| 4,348,599 | 9/1982 | Pradere et al. | 307/426 |
| 4,349,907 | 9/1982 | Campillo et al. | 307/427 |
| 4,618,783 | 10/1986 | Pradere et al. | 372/97 |
| 4,682,340 | 7/1987 | Dave et al. | 372/108 |
| 4,829,528 | 5/1989 | Band et al. | 307/426 |

Primary Examiner—Leon Scott, Jr.
Attorney, Agent, or Firm—Kinzer, Plyer, Dorn, McEachran & Jambor

[57] ABSTRACT

Mode-locked laser comprising an active medium for the emission of a fundamental frequency radiation w1, with a resonator which is defined by a first mirror and a second mirror and in which the active medium is disposed, and a nonlinear optical means which is arranged between the active medium and the second mirror and which in combination with the second mirror effects a preferred reflection of radiation of higher intensity compared with radiation of lower intensity and it converts a fundamental-frequency radiation reversibly into radiation of a first frequency and radiation of a second frequency in such a manner that with increasing intensity the fraction of the radiation of the second frequency increases, and that the second mirror reflects at the second frequency to a greater extent than at the first frequency. A further development of said laser comprises a means for coupling laser radiation of a further frequency w2 into the nonlinear means and a reflector arrangement which is arranged in the path of radiation emerging from the nonlinear means and for the fundamental-frequency radiation w1 and the radiation of the other frequency has a lower reflectivity than for radiation (w1+w2; w1−w2) which arises by interaction of the two laser radiations in the nonlinear means. In this manner a simple synchronization of the mode-locked laser with the coupled-in laser radiation is possible. The coupled-in laser can originate from a second laser medium which is arranged in a second resonator which has a part in common with the first resonator.

16 Claims, 5 Drawing Sheets

MODE-LOCKED LASER

BACKGROUND OF THE INVENTION

1. Field of the Invention

The invention relates to lasers, in particular mode-locked lasers.

2. Description of the Related Art

Passive mode-locking is a known method for generating with lasers ultrashort pulses (i.e. pulses of less than 100 ps FWHM) (see e.g. N.R. Belashenkov et al.: YAG: $Nd^3$ +LASER FOR STUDY OF HIGHSPEED PROCESSES, Instr. +Exp. Techn. No. 1, 1987, 204–205). For passive mode-locking it is known to arrange a thin cuvette with a dye solution absorbing the laser wavelength just in front of a resonator mirror in the resonator of the laser. Since with suitably selected dyes the transmission of such a dye solution depends on the incident light intensity because higher light intensities set more dye molecules into an excited state in which they cannot absorb the laser light or can only slightly absorb the laser light, i.e. are bleached, on oscillation buildup of the laser when pronounced fluctuations (photon noise) are still present only the respective most pronounced noise peak is allowed to pass through the dye solution with relatively little attenuation whilst the weaker noise peaks are highly suppressed. In the resonator a pulse running to and fro and becoming increasingly steeper and shorter is formed and each time said pulse strikes the coupling-out mirror a certain fraction thereof is coupled out so that in this manner at the output of the laser a train of ultrashort pulses appears.

The disadvantages of this method reside in particular in the low photochemical stability of the dye solution and in the critical setting of the dye concentration and of the position and thickness of the dye cuvette. The frequently required emission of the half wavelength can be produced in this case only by external frequency doubling in a frequencydoubling crystal and not by the generally particularly efficient doubling within the resonator (see e.g. Falk et al.: Pulse Width of the Mode-Locked, Intervally Frequency-Doubled Laser, IEEE Journal of Quantum Electronics, Vol. QE-11, No. 7, July 1975, 365–367; S. Umegaki: An Efficient Method of Second Harmonic Generation Interval to Laser Cavity, JAPAN. J. Appl. phys. Vol. 15 (1976) No. 8, 1595–1596) since the dye solutions at half the laser wavelength frequently exhibit pronounced absorption which leads to high losses.

In addition, for many uses two different types of lasers are required which furnish exactly time-synchronized trains of ultrashort laser radiation pulses. Hitherto this could only be done with considerable expenditure. In a known method for synchronization of two lasers a mode-locked master oscillator is used which synchronously pumps another laser (normally a dye laser) either directly or with its second harmonic. A disadvantage here is that the master oscillator itself must be mode-locked and that the number of combinations of different lasers which can be synchronized in this manner is limited.

In another known synchronization method, in a dye laser a laserable absorber dye is used so that a mode locking of the two lasering media occurs (Z. A. Yasa et al., Appl. Phys. Lett. 30, No. 1, 1977, 24–26; see also W. Dietel et al., OPTICS COMMUNICATIONS, 35, No. 3, Dec. 1980, 445, 446). The disadvantage of this method resides in that the pump laser wavelength must be adapted to the absorption of the laser dye and this again limits the number of possible combinations. It is also frequently desired to generate ultrashort pulses with different wavelengths, for example with the sum or difference frequency of the radiation of two mode-locked lasers. Hitherto, for this purpose generally an additional nonlinear medium was used.

SUMMARY OF THE INVENTION

Proceeding from a mode-locked laser having an active medium, an optical resonator which is defined by a first mirror and a second mirror and in which the active medium is arranged, and a nonlinear optical means for passive mode-locking arranged between the active medium and the second mirror, the present invention solves the problem of providing a mode-coupled laser having an improved means for passive mode-locking which has a good stability and can be simply employed, has a short response time and moreover permits a frequency multiplication or more generally a frequency conversion within the resonator.

According to the invention the nonlinear optical means in combination with the second mirror effects a preferred reflection of radiation of higher intensity compared with radiation of lower intensity and it converts fundamentalfrequency radiation of the laser reversibly into radiation of a first and a second frequency in such a manner that with increasing intensity the fraction of the radiation of the second frequency increases and the second mirror reflects at the second frequency to a greater extent than at the first frequency. The nonlinear optical means may contain a frequency-doubling optical element or a parametric optical element. In the former case the first frequency is the fundamental frequency fo of the laser and the second frequency is 2fo. In the second case two frequencies f1, f2 are generated which are lower than fo.

Further developments of the invention make it possible to mode-lock two lasers in simple manner without involving appreciable restrictions as regards the types of the modelocked lasers. In specific embodiments the sum or the difference frequency of the laser frequencies of the two lasers is available.

The apparatus according to the invention permits a substantially stabler generation of ultrashort pulses by passive mode-locking of a laser than was hitherto the case. The known nonlinear optical crystals generally have a very high destruction threshold compared with a cuvette with dye solution and their properties are constant in time in contrast to dye solutions. Furthermore, the present apparatus is easy to set up and to adjust and does not require any additional auxiliary means, for example a circulating pump, as is necessary with a cuvette with dye solution to avoid striation in the solution and to obtain a somewhat greater long-time constancy of the absorption. Furthermore, in contrast to the finite relaxation times of the dyes in a solution according to the conventional method, with the method according to the application an immeasurably short response time is obtained by purely electronic operations so that in contrast to the conventional method the shortness of the pulses obtainable now depends only on the active medium.

By a simple further development of the invention it is possible to obtain in simple manner a mode-locking and synchronization of two lasers. This aspect is quite universally applicable and is subject to practically no restrictions as regards the wavelength ranges of the synchronized lasers. Moreover, pulse trains are available with the sum or difference frequency of the two laser frequencies, giving still further possible uses of the invention.

BRIEF DESCRIPTION OF THE DRAWINGS

Examples of embodiment of the invention will be explained hereinafter with the aid of the drawings, wherein.

DESCRIPTION OF PREFERRED EMBODIMENTS

Figure 1:
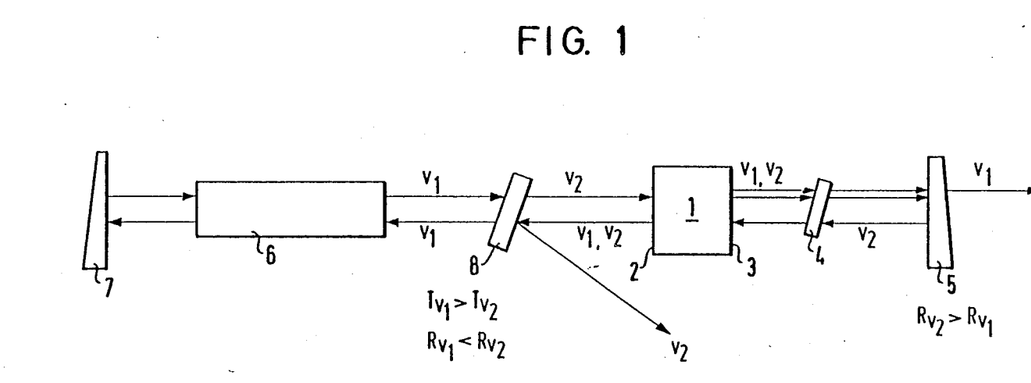
FIG. 1 is a schematic representation of the makeup of a mode-locked laser according to a preferred example of embodiment of the present invention.

The laser according to FIG. 1 contains a laser resonator having a first resonator mirror 7 and a second resonator mirror 5, an active medium 6, a frequency-doubling element, such as a frequency-doubling crystal 1 with antireflexcoated inlet and exit faces 2 and 3, rotatably disposed plane-parallel glass plate 4 and a dichroitic mirror 8 which has a relatively high transmission for the fundamental wavelength of the radiation emitted by the laser medium 6 and a maximum reflection for the wavelength of the frequency-doubled radiation. The resonator mirror 7 has a maximum reflection at the fundamental wavelength but in contrast the resonator mirror 5 has a maximum reflection for the frequency-doubled radiation and for the radiation of the fundamental wavelength has a smaller reflection R than for the frequency-doubled radiation, e.g. $R=0.05$ to $R=0.3$ and above.

If the active medium 6 is pumped beyond the threshold of laser oscillation, in the frequency-doubling crystal 1 part of the fundamental-frequency laser radiation is converted to frequency-doubled radiation. The degree of conversion $\eta$ increases of course in proportion to the intensity of the laser radiation. If on reentering the frequency-doubling crystal the frequency-doubled radiation reflected by the mirror 5 has the correct phase position then it is mostly reconverted to the fundamental frequency. Due to the different dispersion in air and glass for the two wavelengths this can always be achieved for example by turning the glass plate 4 through a small angle to achieve a somewhat modified optical path length at which these conditions are fulfilled or by moving the mirror 5 along the optical axis or alternatively appropriately changing the air pressure in the resonator. The overall effect is that by the combination of the mirror 5 and the frequency-doubling crystal for the fundamental frequency an effectively higher reflectivity is in fact achieved than without frequency doubling or with incorrectly set phase matching between the fundamental frequency and harmonic.

A more exact theoretical consideration shows that the effective reflectivity which is caused by this nonlinear behaviour of the frequency-doubling crystal and is denoted here by $R_{n1}$ is given by $$R_{n1} = [\eta R_2 + (1-\eta)R_1]\{1 - \tanh^2\{[\eta R_2 + (1-\eta)R_1]^{\frac{1}{2}} \cdot \operatorname{artanh} \sqrt{\eta} - \operatorname{artanh}\{(\eta R_2)^{\frac{1}{2}}/[\eta R_2 + (1-\eta)R_1]^{\frac{1}{2}}\}\}\}. \quad (1)$$

Figure 2:
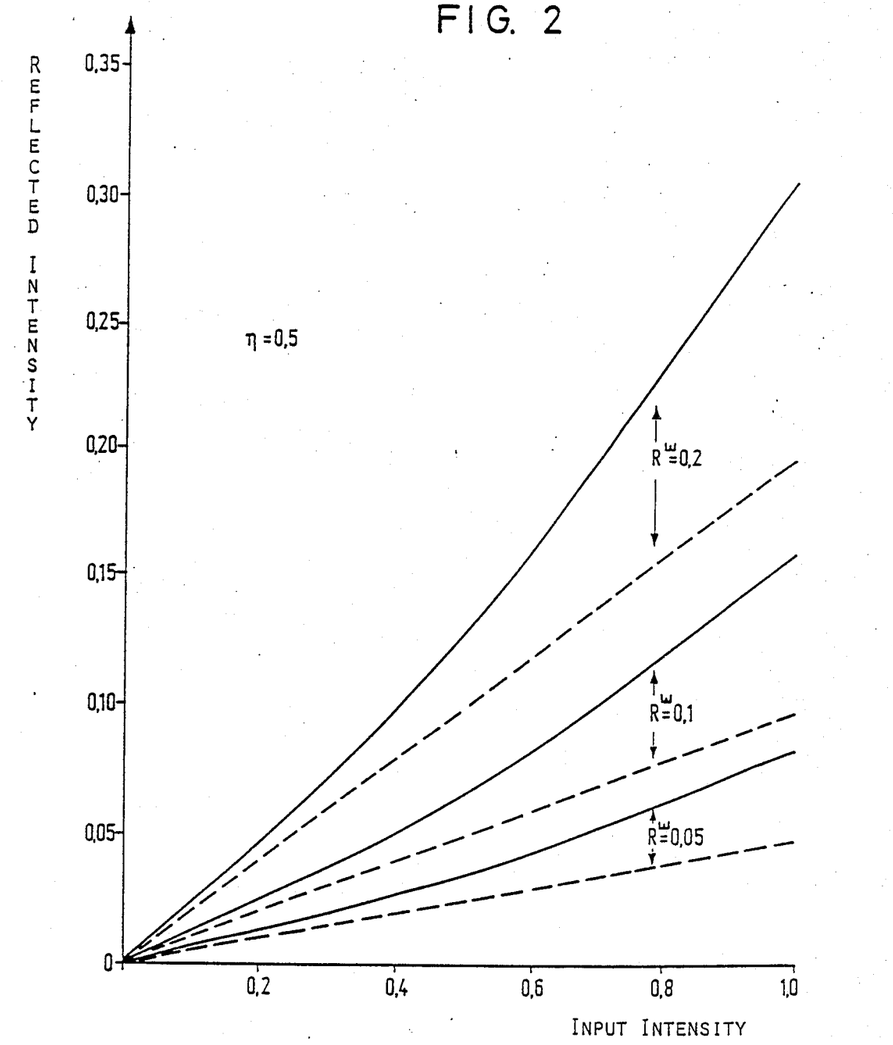
FIG. 2 is a diagram explaining the present invention.

$R_1$ is the (linear) reflection coefficient of the mirror 5 for the fundamental wavelength and $R_2$ the (linear) reflection coefficient of the mirror 5 for the frequency-doubled wave. For the case $\eta=0.5$, i.e. for an efficiency of 50% in the conversion of the fundamental frequency to the harmonic, FIG. 2 shows a set of curves which represents the intensity of the reflected radiation of the combination frequency-doubling crystal 1, glass plate 4 and mirror 5 as a function of the normalized input intensity with $R_1$ as parameter, the full lines standing in each case for the nonlinear reflection $R_{n1}$ and the dashed lines for the linear reflection $R_1$ without frequency-doubling crystal. A more exact theoretical explanation follows.

Since with the laser arrangement according to the invention as well the noise peaks of higher intensity lead to a higher reflection and thus to a greater all-round amplification, similar to the known apparatus for passive mode-locking, once again a single ultrashort pulse will form which circulates in the resonator. Consequently, an ultrashort pulse will form not only at the fundamental wavelength but also at the harmonic, but this pulse will mostly be reconverted to the fundamental wavelength by the frequency-doubling crystal in the manner just outlined. However, the remainder of the frequency-doubled light not reconverted can be coupled out by the dichroitic mirror 8 as short pulse with half the wavelength of the fundamental wave.

Figure 3:
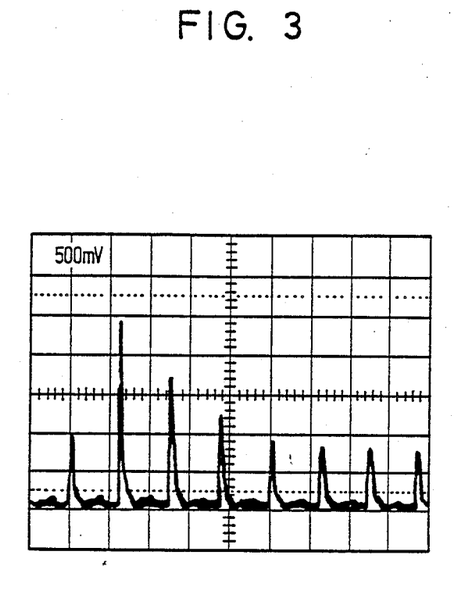
FIG. 3 is an oscillogram which shows the time variation of a laser pulse train generated with a laser according to FIG. 1.

FIG. 3 illustrates an oscillogram which shows the time profile of a laser pulse train generated in an arrangement according to FIG. 1. Since this oscillogram was taken with a photodiode oscillograph combination with a rise time of 350 ps the true pulse width is not apparent. However, with a nonlinear optical method it was established that said width is less than 100 ps. The attainable full width half maximum is downwardly limited only by the nonlinear optical medium 6 but not by the arrangement comprising the nonlinear optical crystal, the glass plate and the mirror, because the response time of the nonlinear optical crystal is governed by purely electronic processes and is therefore practically immeasurably short.

The example of embodiment according to FIG. 1 shows the particularly simple case of the use of a frequency-doubling crystal but in principle, in the present invention, instead of a frequency-doubling crystal another nonlinear optical means may be used which reversibly converts the fundamental frequency to one or more other wavelengths. Thus, as nonlinear optical means arrangements can also be employed having two crystals by which altogether a frequency triplication by known methods can be achieved. Another variation uses parametric optical crystals which split the fundamental frequency into two lower frequencies, the sum of which is again equal to the fundamental frequency. Since such modifications can easily be derived by the expert from the example explained above with the frequency-doubling crystal no details need be given. Likewise, further variations can be indicated which can readily be implemented by the expert when required;

for example, the dichroitic mirror 8 can be omitted and the coupling-out of the frequency-doubled radiation transmitted by the non-linear medium 6 can be effected by the mirror 7, which then preferably has maximum transmission for the frequency-doubled radiation. However, this is expedient only when the active medium 6 does not have any appreciable absorption for the frequency-doubled wave, as is for example the case with Nd-YAG. It has also already been mentioned that the glass plate 4 for phase matching can be omitted (although it represents a particularly convenient means for obtaining the phase matching by simple rotation of the glass plate) when the dispersion of the air is utilized between the nonlinear optical crystal 1 and the mirror 5, between which the correct distance must then be set. It has also already been mentioned that instead of changing the mirror position the pressure of the air can be changed, this being particularly expedient when the entire arrangement is in any case installed in a pressure vessel, for example, to provide protection against dust.

In a further development of the present method, at the same time a Q-switching is effected in the resonator by known methods, for example by means of a Pockel cell. Finally, the present method, exactly like the known method for passive mode-locking, can be used very well in conjunction with an active method for mode-locking, for example by means of an acoustooptical mode coupler. As is known this results in a particularly high amplitude stability.

Suitable materials for the nonlinear optical means are crystals of KDP, KTP, KDDP, lithium niobate and the like.

In a preferred embodiment of the invention the resonator has the length of about 1 meter, this being fairly uncritical, the active laser medium is Nd-YAG and the nonlinear optical means is a frequency-doubling crystal of KTP. The reflectivity of the one resonator mirror 5 at the fundamental wavelength 1060 nm of the Nd-YAG radiation is about 30% and for the frequency-doubled Nd-YAG radiation (530 nm) is substantially 100%.

Figure 4:
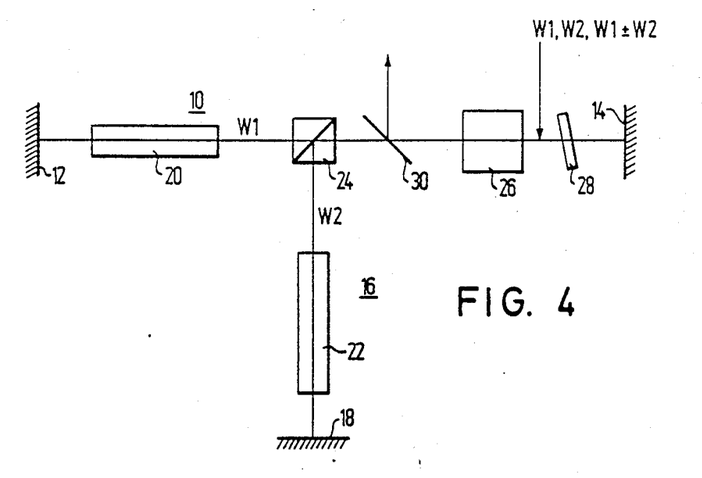
FIG. 4 is a schematic illustration of two synchronously mode-locked lasers with a combined laser resonator arrangement.

The laser arrangement illustrated in FIG. 4 includes a first optical resonance cavity or laser resonator 10 which is defined by a first mirror 12 and a second mirror 14, and a second laser resonator which is defined by a third mirror 18 and the second mirror 14. In the first resonator 10 a first active laser medium 20 is disposed and in the second laser resonator a second active laser medium 22. The arrangement further includes a beam-combining means 24, for example a polarizer arrangement or a dichroic mirror, which is traversed rectilinearly by the beam path between the mirrors 12 and 14 whereas it deflects the beam path between the mirrors 14 and 18 by 90°. In the common part of the beam path between the means 24 and the common second mirror 14 a nonlinear optical medium 26, a rotatably mounted plane-parallel glass plate 28 serving for phase setting and a selectively reflecting coupling-out mirror 30 are disposed.

The nonlinear medium 26 may be a frequency-mixing crystal, for example of KDP, KTP, KDDP, lithium niobate and the like, then generating for example the sum frequency of the fundamental frequencies generated by the two active laser media 20, 22. However, a parametric medium may also be used which furnishes the difference frequency as explained above.

The common second mirror 14 is a trichroic mirror which reflects as far as possible completely the sum or difference frequency but to a lesser extent the fundamental frequencies of the two active laser media 20, 22. The mode of operation of the arrangement according to FIG. 4 will be discussed in detail below.

The arrangement according to FIG. 5 again contains a first laser resonator 10 which is defined by a first mirror 12 and a second mirror 14 and between the first and second mirrors 12, 14 comprises in order an active laser medium 20, a beam-combining means 24, a coupling-out mirror 30, a nonlinear optical medium 26 and a pivotally mounted plane-parallel plate 28 serving for phase setting. The arrangement according to FIG. 5 differs from that according to FIG. 4 however in that the second laser resonator is separate from the first laser resonator and includes its own two mirrors 42, 44 which belong to a laser denoted as a whole by 46. The laser 46 furnishes a train 48 of ultrashort laser radiation pulses which are reflected by the beam-combining means 24 into the beam path of the first laser resonator 10.

Figure 5:
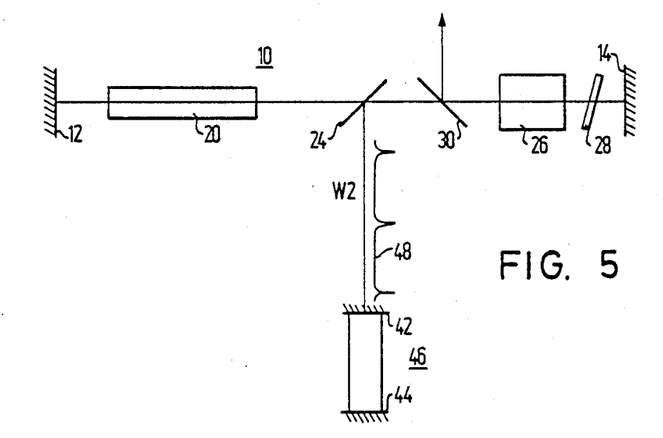
FIG. 5 is a schematic illustration of a means for synchronous mode-locking of a laser to a pulse train of another mode-locked laser.

Of course, corresponding pump means (not shown) are associated with the active laser media 20 and 22 and the non-illustrated laser medium of the laser 46, the type of said pump means depending on the type of the particular laser medium and said pump means permitting in the respective laser medium a population inversion sufficient for laser emission. The optical lengths of the resonator cavities of two mode-locked lasers are identical. The correct phase relationships of the light oscillations reflected by the trichroic mirror 14 can be set, as in FIG. 1, by changing the distance between the nonlinear medium and the trichroic mirror or by changing the (air) pressure between said two elements or by any other suitable steps.

There now follows a detailed discussion of the principle of the mode-locking of the two lasers according to FIG. 4 which contain a common laser resonator part, and the mode-locking of the laser 46 to the laser containing the resonator 10 in accordance with FIG. 5. For both arrangements the beam-combining means 24, the nonlinear medium 26 and the trichroic mirror 14 are essential.

Under certain conditions the reflectivity for the light oscillations and the two laser radiation fundamental frequencies w1 and w2 entering the nonlinear medium 26 from the side of the means 24 increases with the intensity of said light oscillations. These conditions are: the reflectivity R3 of the trichroic mirror 14 at the sum or difference frequency approaches 100 percent; the reflectivities R1, R2 of the mirror 14 at the fundamental frequencies w1 and w2 of the laser media 20 and 22 respectively are less than R3 and the three light oscillations which are reflected by the trichroic mirror 14 have the correct phase relationships. The optimum value for the reflectivities R1, R2 of the mirror 14 (and in the case of FIG. 1 the reflectivities R1, R2 of the mirror 18) for the laser fundamental frequencies w1 and w2 can be determined empirically and depend on apparatus parameters such as the amplification per circulation and saturation intensity. R1 and R2 may for example lie between 0.05 and 95 percent when R3 is close to 100 percent. Generally, the value of R3 should be greater than one of the values R1 and R2.

A more exact investigation shows that the nonlinear reflectivities $R1^{NL}$ and $R2^{NL}$ of the combination of the nonlinear medium 26 and the trichroic mirror 14 for the two laser fundamental frequencies w1 and w2 are given for the case of generation of the sum frequency $w3 = w1 + w2$ by the nonlinear medium 26 by the following equations:

$$R1^{NL}=A(1-sn^2[\{-\overline{\beta B}.sn^{-1}(\sqrt{\eta},\sqrt{\beta})+ \quad (2)$$

$$sn^{-1}[(\eta R3/A)^{\frac{1}{2}},\sqrt{A/B}]\},\overline{A/B}]),$$

$$R2^{NL}=\beta(B-A+R1^{NL}) \quad (3)$$

wherein $\beta = n1/n2$ is the ratio of the normalized photon numbers of the two input fundamental waves and $\eta$ is the photon conversion efficiency for the fundamental wave w1 to the sum frequency radiation. Consequently $$A=(1-\eta)R1+R3 \quad (4)$$

$$B=(1/\beta-\eta)R2+R3. \quad (5)$$

Figure 6:
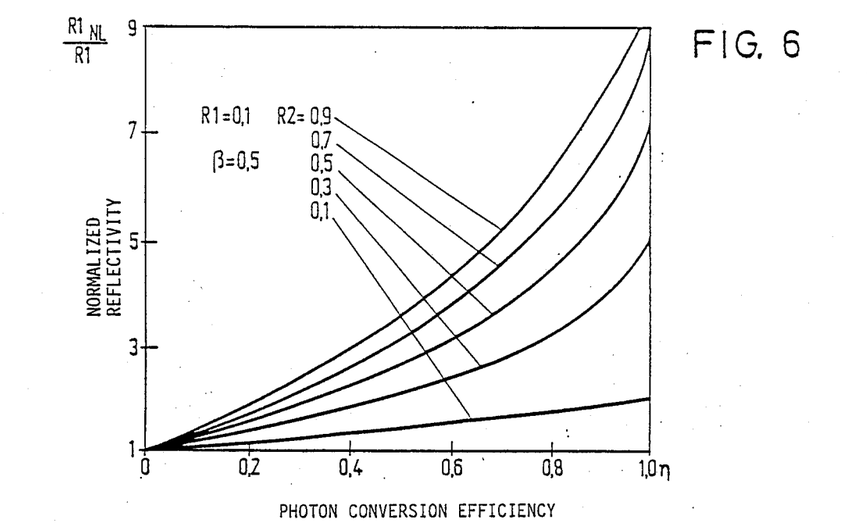
FIGS. 6 and 7 are diagrams to explain the mode of operation of the lasers according to FIGS. 4 and 5.
Figure 7:
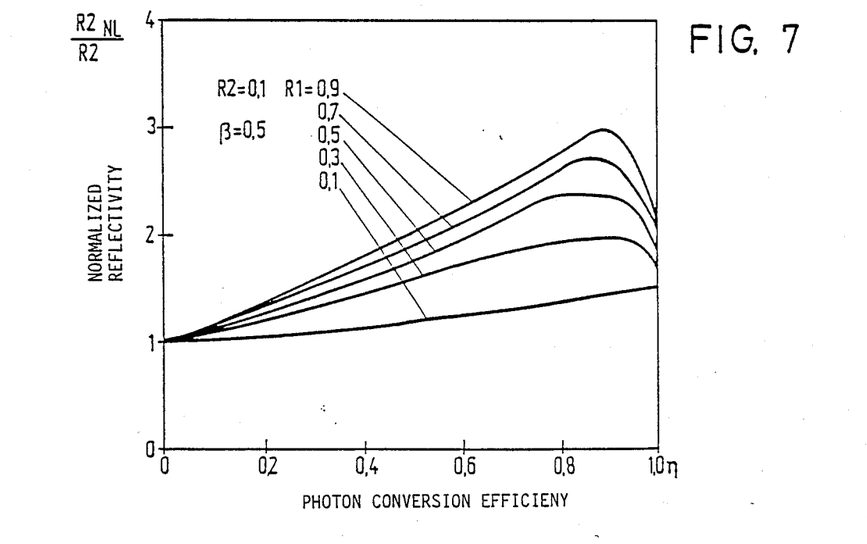

In equation (2) sn(u,m) and $sn^{-1}$(u,m) are the Jacobian elliptic function and its inverse and R1, R2 are the reflectivities of the trichroic mirror 14 at the fundamental frequencies of the two laser media 20, 22. In FIGS. 6 and 7 the dependence of the nonlinear reflection coefficients $R1^N$ and $R2^{NL}$ on $\eta$ is shown. Since the conversion efficiency is proportional to the input intensities the reflectivities obviously increase with the light intensities. If a nonlinear optical means with such properties is arranged in the interior of the laser resonator cavity this leads, as is known, to a pulse-amplitude selection and pulse shortening so that finally a single ultrashort light pulse results from the initial statistical light fluctuations. The combination of the nonlinear medium 26 and the trichroic mirror 14 can thus be regarded as a nonlinear optical device which effects a synchronous mode-locking of the two lasers (10 and 16 or 10 and 46) sharing one part of the resonators.

The conditions are quite similar if, as is the case in FIG. 5, a pulse train 48 is coupled from outside into the laser resonance cavity defined by the mirrors 12 and 14. The coupled-in pulse train modulates the reflectivity for the laser radiation generated by means of the active medium 20 so that synchronous mode-locking results.

The embodiments described above can of course be modified in a great variety of ways. For example, the arrangement may be such that the nonlinear medium is suitable for non-colinear sum or difference frequency generation. In this case, the optical axes or ray paths of the two laser resonators, which should have the same length, intersect at a point in which the nonlinear medium is arranged and an additional mirror is provided which reflects the radiation emerging from the nonlinear medium back into the latter. This mirror and/or the second mirror 14 in the beam path between the first and second mirror have a high reflectivity for the sum or difference frequency and a low reflectivity for the laser radiation frequencies. The nonlinear means can also contain a Raman-active medium. The laser frequencies w1, w2 must then satisfy the conditions $$w1-w2=\Omega \text{ or } w2-w1=\Omega \quad (6)$$

$\Omega$ being the Raman frequency shift of the medium.

We claim:

1. A mode-locked laser comprising:
a first mirror and a second mirror, spaced from each other, each of said mirrors having predetermined reflection characteristics, said first and second mirrors defining an optical resonator;
an active laser medium, adapted to emit laser radiation at a predetermined fundamental frequency upon stimulation of the laser medium, positioned between said first and second mirrors; and
non-linear optical means, positioned in said resonator between said active laser medium and said second mirror, for reversibly converting said fundamental frequency radiation into radiation of a first frequency and radiation of a second frequency, with the ratio of the intensity of radiation at said second frequency relative to the intensity of radiation at said first frequency increasing with increasing intensity of said fundamental frequency radiation;
the reflectivity of said second mirror at said second frequency being greater than its reflectivity at said first frequency.

2. A mode-locked laser, according to claim 1, in which said non-linear optical means includes a frequency-doubling optical element, in which said first frequency is the same as said fundamental frequency, and in which said second frequency is twice said fundamental frequency.

3. A mode-locked laser, according to claim 1, in which said first frequency is the same as said fundamental frequency, and in which said second frequency is three times said fundamental frequency.

4. A mode-locked laser, according to claim 1, in which said non-liner optical means includes a parametric optical element, and in which said fundamental frequency is the sum of said first and second frequencies.

5. A mode-locked laser, according to claim 1, and further comprising phase setting means for adjusting the phase position of radiation reflected by said second mirror.

6. A mode-locked laser, according to claim 5, in which said phase setting means comprises a rotatable plane-parallel glass plate positioned between said non-linear optical means and said second mirror.

7. A mode-locked laser, according to claim 1, and further comprising diversion means, positioned between said active laser medium and said non-linear optical means, for diverting some radiation, at said second frequency, out of the resonator.

8. A mode-locked laser, according to claim 7, in which said diversion means includes a dichroitic mirror which reflects radiation at said second frequency to a greater extent than it reflects radiation at said first frequency.

9. A mode-locked laser comprising:
an active laser medium, responsive to stimulation, for emission of radiation at a fundamental frequency w1;
first reflector means, facing one end of a first beam path;
second reflector means, facing the other end of said first beam path, said laser medium being positioned in said first beam path between the two reflector means, said two reflector means defining a first optical laser resonator;
non-linear optical means, positioning between said active laser medium and said second reflector means, which, in combination with said second reflector means, effects a preferred reflection of radiation of higher intensity compared with radiation of lower intensity and reversibly converts fundamental-frequency radiation into radiation of a first frequency and radiation of a second frequency in such a manner that with increasing intensity of the fundamental-frequency radiation the relative portion of the radiation of the second frequency increases;

said second reflector means reflecting to a greater extent at said second frequency than at said first frequency;

and beam-combining means for applying a second laser radiation of a further frequency w2 to said non-linear means;

said second reflector means having a lower reflectivity for the fundamental-freuqency radiation and the radiation of the other frequency than for radiation at frequencies w1+w2 or w1−w2 which arises by interaction of the two laser radiations in said non-linear means.

10. A mode-locked laser, according to claim 9, in which said beam-combining means is positioned between said active laser medium and said non-linear optical means in said first beam path between said first and second reflector means and is also positioned in a second beam path for said second laser radiation w2, and in which said beam combining means deflects said second laser radiation into the part of said first beam path containing said non-linear means.

11. A mode-locked laser, according to claim 10, in which said second beam path contains a second active laser medium and in which said second beam path is defined, on the side of the second laser medium remote from the beam-combining means, by a third reflector means.

12. A mode-locked laser, according to claim 10, in which said second beam path contains a further laser.

13. A mode-locked laser, according to claim 9, in which said second laser radiation, at said further frequency, runs in a second beam path which intersects said first beam path between said first and second reflector means in said non-linear means and is defined by a further reflector means.

14. A mode-locked laser, according to claim 9, characterized in that said non-linear means includes a crystal for generating at least one of the sum and difference frequencies of said two laser radiations.

15. A mode-locked laser, according to claim 9, in which said non-linear means contains a Raman-active medium and in which the two laser frequencies fulfill one of the two conditions $w1-w2=\Omega$ and $w2-w1=\Omega$, $\Omega$ being the Raman shift of said non-linear medium.

16. A mode-locked laser, according to claim 9, in which said non-linear means contains a parametric means.

* * * * *